(12) United States Patent
Baker

(10) Patent No.: US 6,382,643 B1
(45) Date of Patent: May 7, 2002

(54) PORTABLE CROSS-FRAMED DOLLY

(76) Inventor: Franklin W. Baker, 5642 S. LaBrea Apt. 9A, Los Angeles, CA (US) 90056

( * ) Notice: Subject to any disclaimer, the term of this patent is extended or adjusted under 35 U.S.C. 154(b) by 0 days.

(21) Appl. No.: 09/658,723

(22) Filed: Sep. 11, 2000

(51) Int. Cl.$^7$ ................................................. B62B 1/00
(52) U.S. Cl. ..................... 280/79.11; 294/1.1; 242/400; 16/110.1; 280/47.11
(58) Field of Search .......................... 280/79.11, 47.371, 280/47.34, 79.2, 79.5, 47.11; 294/1.1, 19.1; 242/395, 400, 403; 16/113.1, 405, 35 R, 437, 110.1

(56) References Cited

U.S. PATENT DOCUMENTS

| | | | | |
|---|---|---|---|---|
| 375,406 A | * | 12/1887 | Wilson et al. | 280/79.11 |
| D27,784 S | * | 10/1897 | Gander | 280/79.11 |
| 2,544,924 A | * | 3/1951 | Herold | 16/35 R |
| 3,554,573 A | * | 1/1971 | Miller | 280/79.2 |
| 3,802,717 A | * | 4/1974 | Eitreim | 280/79.11 |
| 3,831,959 A | * | 8/1974 | Fontana | 280/79.2 |
| 3,982,613 A | * | 9/1976 | Wood | |
| 4,178,006 A | * | 12/1979 | Johnson | 280/79.11 |
| 4,824,129 A | * | 4/1989 | Rehrig | 280/79.11 |
| 4,854,804 A | * | 8/1989 | Mayle | 280/47.11 X |
| D305,274 S | * | 12/1989 | Yoshikawa | |
| 4,887,825 A | * | 12/1989 | Allen et al. | 242/400 |
| 5,245,732 A | * | 9/1993 | Johnston | |
| D340,563 S | * | 10/1993 | Kean et al. | |
| 6,135,479 A | * | 10/2000 | Tibay et al. | 294/19.1 |
| 6,272,817 B1 | * | 8/2001 | Further | |

FOREIGN PATENT DOCUMENTS

JP 3266770 * 11/1991

* cited by examiner

Primary Examiner—Brian L. Johnson
Assistant Examiner—Bryan Fischmann
(74) Attorney, Agent, or Firm—Albert O. Cota

(57) ABSTRACT

A portable cross-framed dolly (10) that is designed to accept and transport various, loose items or to have attached a container (104), such as a laundry basket, into which items can be placed. The dolly (10) consists of a first frame (12) having a downward projecting first frame slot (28) and a second frame (40) having an upward projecting second frame slot (54). When the two slots (28,54), interface the upper surfaces (18,46) and lower surfaces (20,48) of the two frames (12,40) are on the same plane to thus, form a stable platform (62). To the lower surfaces (20,48), and near the first and second ends of each of the two frames (12,40), is attached a caster which allows the dolly (10) to easily roll when being pulled. The pulling is provided by a flexible pull trap (66) which is removably attached to either the first end (14) or the second end (16) of the first frame (12).

8 Claims, 3 Drawing Sheets

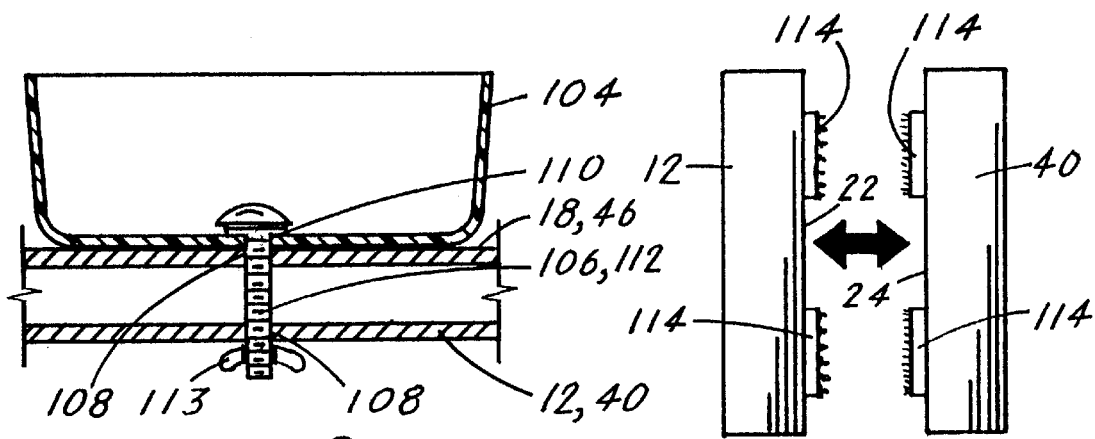
FIG. 8
FIG. 9
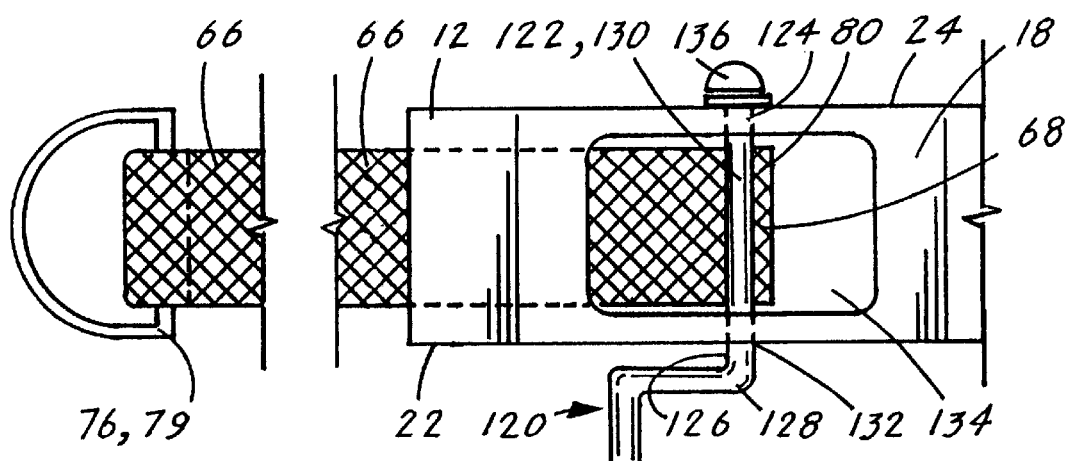
FIG. 10
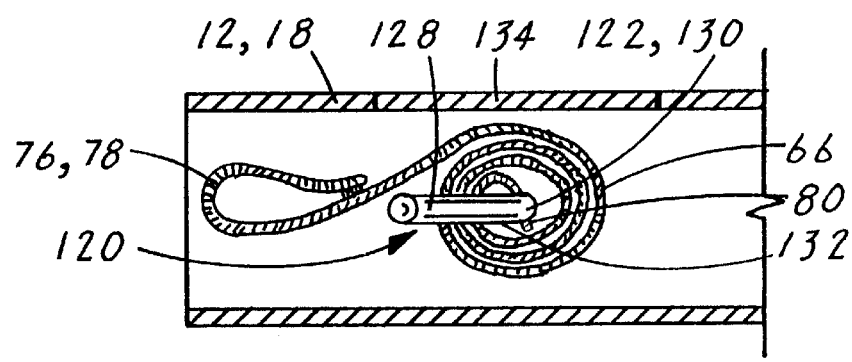
FIG. 11

PORTABLE CROSS-FRAMED DOLLY

TECHNICAL FIELD

The invention pertains in general field of hand pulled and pushed carts and dollies and more particularly to a portable cross-formed dolly that is pulled by means of a flexible strap.

BACKGROUND ART

Previously, carrying devices for relatively small cargo and personal items, such as luggage have been limited to wheeled trucks which are usually constructed of a robust material with a toe plate extending near the bottom for stacking the cargo or luggage. Many varieties and styles of trucks have been used, such as a continuous handle type, bicycle handle, pistol grip handle, single and double loop style, and also "S" pin or tee-type handles. All of these varieties use the same principle of stacking with gravity holding the items against the frame when angled backward toward the operator. The two wheels provide the mobility and steerage is accomplished manually.

For larger quantities of cargo or luggage, four-wheeled platform trucks are used with two steerable wheels and a raised superstructure. While these types of trucks are effective they are usually cumbersome and built to a size that makes it difficult for a single person to use, especially when loaded with heavy items.

Other trucks, such as a wagon type using steerable wheels attached to a towing arm or tongue, have also been in use. Dollies using four castors, either two swivel and two rigid, or all four swivel are common for moving articles and are constructed with rigid decking, such as wood or tubular structure.

These trucks are also effective, but as in the case of the four-wheeled platform truck, they are usually designed and built for carrying and transporting a relatively larger amount of cargo having substantial weight. They are not practical for a single person who is transporting a load of cargo for his or her own use.

A search of the prior art did not disclose any patents that read directly on the claims of the instant invention however, the following U.S. patents were considered related:

| U.S. PAT. NO. | INVENTOR | ISSUED |
| --- | --- | --- |
| 4,274,644 | Taylor | 23 June 1981 |
| 2,869,241 | Owen | 26 August 1958 |
| 2,661,220 | Davis | 1 December 1953 |

The Taylor patent discloses a four-wheeled hand truck that is comprised of a platform; a pair of wheel-connecting bars rotatably attaching to the platform; a plurality of wheels being rotatable; and a handle pivotally connecting at two points on each of the platform. A handle release and locking means attaches to the platform and locks the handle member either in an open or in closed position. The wheels fold up underneath the platform when the handle member is in the closed position.

The Owen patent describes a device for carrying a kitchen stove or the like. The invention comprises two body parts of the same width but of longer and shorter extent. The two parts are hinged together in such manner that they may first occupy extended position upon the floor so as to permit the stove or the like to be placed in upright position upon the larger body Part, whereupon the other body part may be swung up to upright position and the stove may then be strapped in.

The Davis patent discloses a wheel assembly for carrying suitcases or the like. The invention comprises a platform having a set of wheels provided on brackets which can be folded with the wheels against a surface of the suitcase so that they will project a minimum distance form the suitcase consistent with being wholly outside of the normal contour of the suitcase. The folding brackets are detachably mounted on plates which are easily and permanently secured to the outside of the case.

For background purposes and as indicative of the art to which the invention relates, reference may be made to the following remaining patents found in the search:

| U.S. PAT. NO. | INVENTOR | ISSUED |
| --- | --- | --- |
| 2,471,553 | Zuckerman | May 1949 |
| 2,484,951 | Kubo | October 1949 |
| 3,488,062 | Walda | January 1970 |
| 3,963,256 | Stafford | June 1976 |
| 4,273,222 | Cassimally et al | June 1981 |

DISCLOSURE OF THE INVENTION

Cargo is commonly moved by the previously two-wheeled carts, some of which are even carried by the user. More recently, castors have been provided integral with luggage for this purpose. In many cases, more than one piece of cargo is transported at one time, therefore, there has existed a requirement for an alternate method. Further, the means to provide this utility also include carrying the device along with the cargo for loading and unloading.

The inventive cross-framed dolly fills this need, therefore, the primary object of the invention is to provide a lightweight, portable device that may by disassembled into a relatively small package, with a carrying and pulling strap that may be easily attached and detached along with the cargo use.

An important object provides the ease of handling a number of pieces of cargo that are stacked one on top of the other at a low level to the floor, thus minimizing lifting and maximizing the load carrying capabilities of one person.

Another object allows the cargo to be stacked safely, as the strap can encircle the superimposed pieces and the invention includes a non-slip resilient pad to eliminate slipping of the first stacked item. Further, as the cargo is stacked flat, no balance is required such as necessary in a two-wheeled truck where a certain amount of strength is required to maintain balance while manipulating a load.

Still another object provides ease of maneuverability, as the end of the strap is used for towing the cross-framed dolly which is easily moved along with the operation.

Yet another object is that it is also possible to push the dolly forward in circumstances requiring close quarters, such as queues or congested areas.

In addition to the above objects of the invention it is also an object to produce a cross-framed dolly that:

can be constructed of a metal or of a high impact plastic, can be constructed with frame cross-sections of various sizes to accommodate a particular load requirement, requires no or very little maintenance, has a long useful life and is cost effective from a consumer's and manufacturer's points of view.

These and other objects and advantages of the present invention will become apparent from the subsequent detailed description of the preferred embodiment and the claims taken in conjunction with the accompanying drawings.

BRIEF DESCRIPTION OF THE DRAWINGS

FIG. 8 is a side sectional view of a dolly which attached a container such as a laundry basket.

FIG. 9 is a top plan view of a first frame and second frame having a set of hook and loop fasteners that when interfaced allow the two frames to be attached which then facilitate the stowage or carrying of the dolly.

FIG. 10 is a top plan view of a first frame which incorporates a strap crank which allows an extended strap to be wound into the confines of the first frame.

FIG. 11 is a partial side sectional view showing the strap attached to a split shift and wound into the confines of the first frame.

BEST MODE FOR CARRYING OUT THE INVENTION

Figure 1:
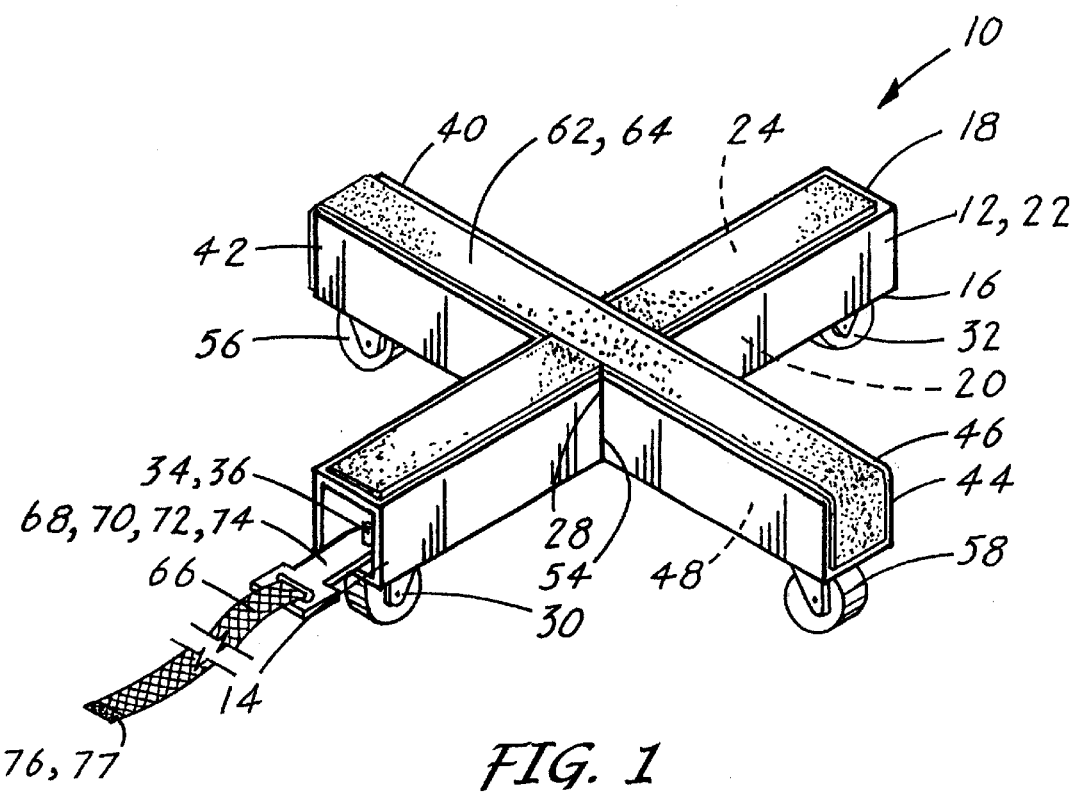
FIG. 1 is a perspective view of a portable cross-framed dolly having a first frame and a second frame having similar lengths.

The best mode for carrying out the invention is presented in terms of a preferred embodiment for a portable, cross-framed dolly, which allows a person to safely and efficiently carry and transport various items. The portable, cross-framed dolly 10, "hereinafter dolly 10" is shown in FIGS. 1–11, and is comprised of the following major elements: a first frame 12, a second frame 40, casters 30,32,56,58, and a flexible pull strap 66.

Figure 2:
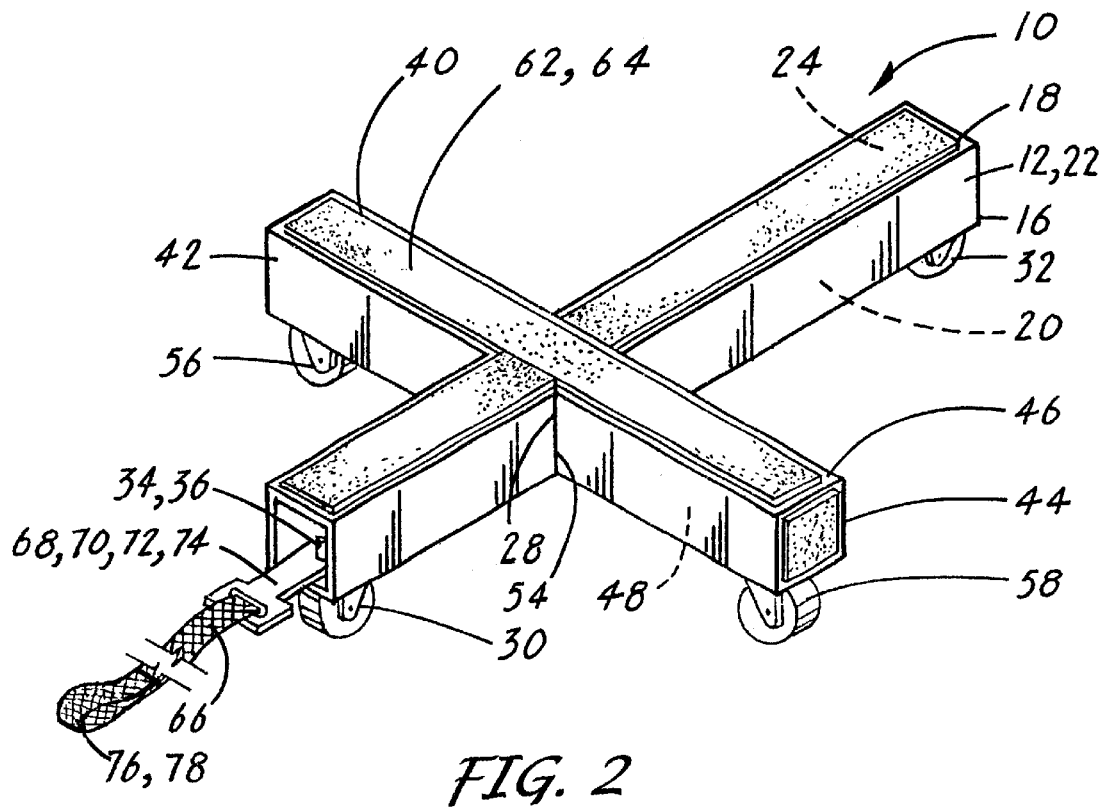
FIG. 2 is a perspective view of a dolly having a first frame with a length that is greater than the length of the second frame.
Figure 5:
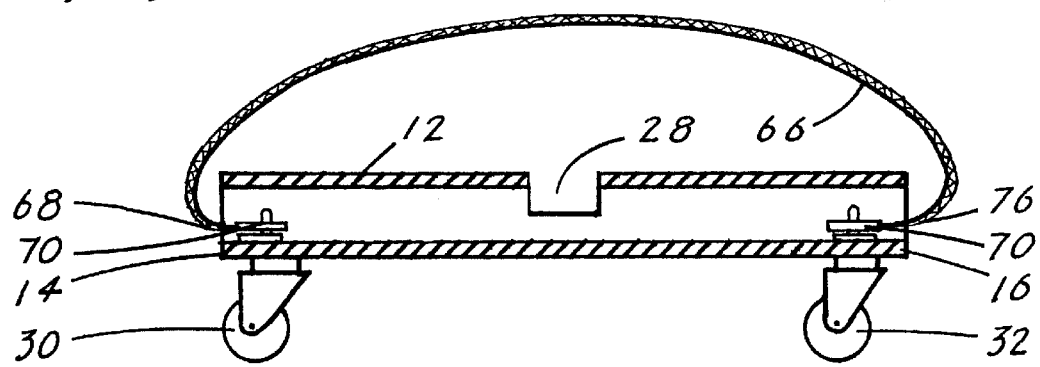
FIG. 5 is a side elevational, sectional view of a first frame having a post on each end, wherein each post receives an end of strap which forms a dolly carrying loop.

As shown in FIGURES 1 and 2, the first frame 12 has a first end 14, a second end 16, an upper surface 18, a lower surface 20, a first side 22 and a second side 24. Projecting downward from the upper surface 18 of the first frame 12 is a first frame slot 28 as shown best in FIGS. 5 and 7. Attached to the lower surface 20 and located adjacent the first end 14 of the first frame 12 is the first caster 30, as shown in FIGS. 1, 2 and 5. This second caster 32 is attached to the lower surface 20 and is located adjacent the second end 16 of the first frame 12. Both the first and second casters 30,32 are attached by means of a bolt 34 that projects upward through the lower surface 20 of the first frame 12. Once the bolt 34 is attached, it functions as a vertical post 36 as shown in FIGS. 1 and 2.

The second frame 40, as shown in FIGS. 1 and 2, also has a first end 42, a second end 44, an upper surface 46 and a lower surface 48. Projecting upward from the lower surface 48 of the second frame 40 is a second frame slot 54. The third caster 56 is attached to the lower surface 48, and is adjacent the first end 42 of the second frame 40. The fourth caster 58 is attached to the lower surface 48 and is adjacent the second end 44 of the second frame 40. Both the third and fourth casters 56,58 are shown in FIGS. 1 and 2.

Figure 7:
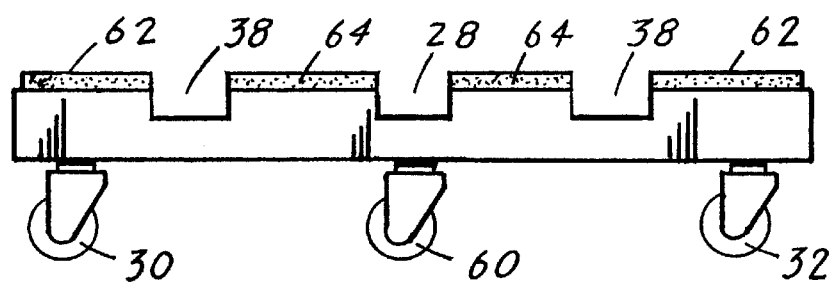
FIG. 7 is a side View of a dolly which has attached a centered caster.

The second frame slot 54 on the second frame 40 is dimensioned to fit into the first frame slot 28 on the first frame 12 as shown in FIGS. 1 and 2. When the two slots 28,54 interface, the upper and lower surfaces 18,20 of the first frame 12 are on the same plane as the upper and lower surfaces 46,48 of the second frame 40. With the two frames 12,40 together, a stable flat platform 62 is formed, as shown in FIGS. 1 and 2. The first frame 12 and/or the second frame 40 can be designed to include additional frame slots 38 as shown in FIG. 7. When the additional frame slots 38 interface with corresponding additional frame slots 38 on a respective cross frame, the dolly's platform 62 has a larger load-carrying capability.

The length of the first frame 12 can be substantially identical to the length of the second frame 40, as shown in FIG. 1, or the length of the first frame 12 can be greater than the length of the second frame 40, as shown in FIG. 2. Each frame, which can be constructed of metal or high-impact plastic, can be constructed to whatever length is appropriate for the dolly's function, but preferably each frame is either 12-inches (30.5 cm), 14-inches (35.6 cm), 18-inches (45.7 cm), 20-inches (50.8 cm) or 22-inches (55.9 cm). The 22-inch (55.9 cm) dolly, which preferably has attached a center caster 60 as shown in FIG. 7, is particularly suited for use in automotive garages to stack and move vehicle tires, wheels and/or wheeled tires.

Additionally, to provide a more secure surface on which to place items to be transported, a non-slip pad 64 can be attached, by an attachment means such as adhesive, to the upper surface 18,46 of the first and second frames 12,40, as shown in FIGS. 1, 2 and 7. If necessary, the non-slip pad 64 may extend over the first and second ends 42,44 of the second frame 40 as shown in FIG. 1, or a separate piece may be attached as shown in FIG. 2.

Figure 4:
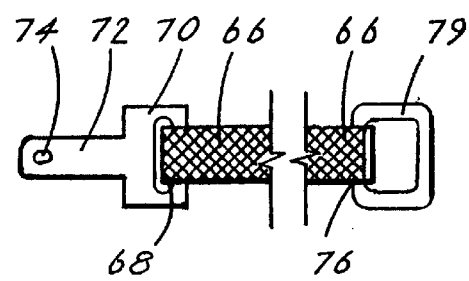
FIG. 4 is a plan view of a flexible pull strap having an inner end attached to a buckle and an outer end which can be terminated in a hand grip or in a loop.

In order to move the dolly 10, the flexible pull strap 66, which is shown in FIGS. 1, 2 and 4, is utilized. The pull strap 66 is comprised of an inner end 68, which is attached to a slotted buckle 70 having an integrally-attached, outward projecting, flat section 72 having a bore 74 therethrough. When the flat section 72 is inserted into the first or second end 14,16 of the first frame 12, as shown in FIGS. 1 and 2, the bore 74 seats itself over the respective vertical post 36, thus causing the strap 66 to be quickly attached and detached. The flexible pull strap 66 is also comprised of an outer end 76 which can be terminated with a sewn seam 77, as shown in FIG. 1, a loop 78, as shown in FIG. 2, or can include a pull ring 79 as shown in FIG. 4. As shown in FIGS. 1 and 2, when the strap 66 is attached, the dolly 10 can be pulled by means of the strap 66.

Additionally, as shown in FIG. 5, both the inner end 68 and the outer end 76 of the strap 66 may have a slotted buckle 70 attached. The buckle 70 has an integrally-attached, outward projecting, flat section 72 having a bore 74 therethrough. When the flat section 72 is inserted into each end 14,16 of the first frame 12, the bore 74 seats itself over the respective vertical post 36 to thus form a loop 78, which can be grasped and used to pull or lift the dolly 10.

Figure 6:
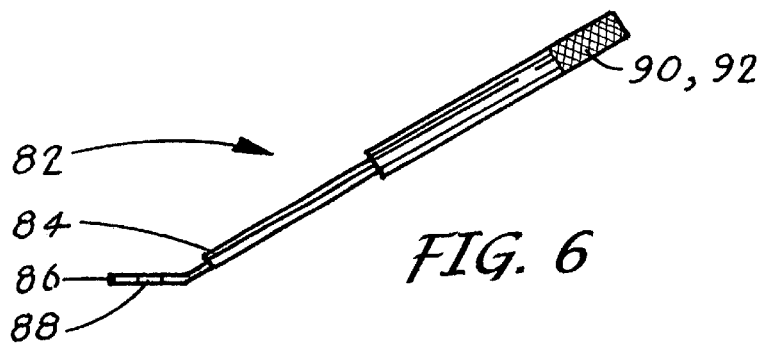
FIG. 6 is a side view of a rigid telescoping handle.

In lieu of the strap 66, the dolly 10 can be also operated by use of a rigid telescoping handle 82, as shown in FIG. 6. The handle 82 has an inner end 84 terminating in an angled flat section 86 having a bore 88 therethrough. When the flat section 80 is inserted into the first or second end 14,16 of the first frame 12, the bore 88 seats itself over the respective vertical post 34, thus causing the handle 82 to be swivelly attached. With the handle 82 attached the dolly 10 can be easily pulled and maneuvered. The telescoping handle 82 can also include on its outer end 90 a hand grip 92, as also shown in FIG. 6. The hand grip 92 facilitates the grasping and pulling of the telescoping handle 82.

Figure 3:
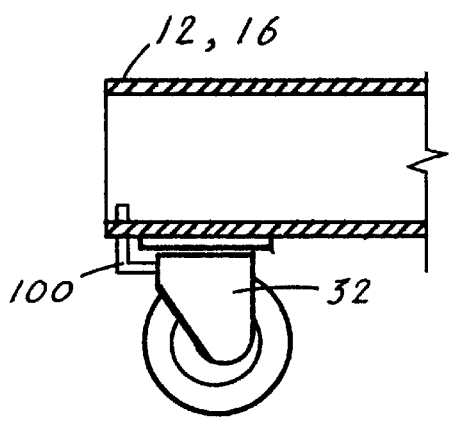
FIG. 3 is a partial side-elevational, sectional view of a caster attached to the lower surface of a first or second frame.

To stabilize the dolly 10, the second caster, which is attached to the second end 16 of the first frame 12 incorporates a locking pin 100 as shown in FIG. 3. The locking pin 100 allows the caster 32 to be locked in longitudinal alignment with the first frame 12, thus preventing the dolly 10 from fish tailing when the dolly is being pulled. Additionally, to further increase the stability and strength of the dolly 10, a center caster 60 can be attached to the center of the first frame 12, as shown in FIG. 7.

To add to the dolly's 10 utility, a container 104, such as a laundry basket, can be rigidly attached, by an attachment means 106, to the upper surfaces 18,46 of each frame 12,40, as shown in FIG. 8. The attachment means 106 for attaching the container 104 to the dolly comprises the first and second frames 12,40 having a frame bore 108 projecting through each of their centers. The container 104 also has a container bore 110, which is substantially centered through its base. A threaded bolt 112 is inserted through the bores 108,110 and a wing nut 113 is then threaded and tightened on the bolt 112. Once the wing nut 113 is completely tightened, the container is secured to the dolly's platform 62.

In order to allow the dolly 10 to be conveniently stowed and easily carried, a set of hook and loop fasteners 114 can be attached to the sides 22,24 of the first and second frames 12,40. When the two sides interface, they are attached by the hook and loop fasteners 114, as shown in FIG. 9.

The final element disclosed for the portable cross-framed dolly consists of a strap crank 120 that is operated to retract a flexible pull strap 66 that has been extended.

The strap crank 120, as shown in FIGS. 10 and 11, operates in combination with a first frame 12 and the flexible pull strap 66. To attach the strap crank 120 the first frame 12 is modified to include a crank bore 132 which extends through the frame's first side 22 and the second side 24. On the upper surface 18 of the first frame 12 is also a crank access opening 134 located substantially over the crank bore 132.

The strap crank 120 has a shaft 122 with an inner end 124 and an outer end 126. From the outer end 126 extends integrally an offset section 128. The shaft 122 is rotatably inserted into the crank bore 132 with the inner end 124 of the shaft 122 protruding through the second side 24 of the first frame 12 and the offset section 128 protruding through the first side 22 of the first frame 12 as best shown in FIG. 10. To secure the strap crank 120 a cap 136 is attached to the inner end 124 of the shaft 122 as also shown in FIG. 10.

The inner end 68 of the pull strap 66 is attached, by an attachment means, to the shaft 122 of the strap crank 120. The preferred strap attachment means consists of the shaft 122 having a longitudinal split 130 and the strap having a lateral obstruction 80 across the strap's inner end 68, as shown in FIGS. 10 and 11. When the pull strap 66 is inserted into the split shaft 130 the obstruction 80 secures the strap 66 to the shaft 122.

To extend the pull strap 66 the strap's outer end 76 which can consist of pull ring 79, as shown in FIG. 10, or a loop 78, as shown in FIG. 11, is pulled outward. To retract the strap 66 the offset section 128 is rotated, either clockwise or counter-clockwise, to cause the strap 66 to be wound onto the shaft 122 as shown in FIG. 11.

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

What is claimed is:

1. A portable cross-framed dolly comprising
   a) a first frame having a first end, a second end, an upper surface, a lower surface, a first side and a second side,
   b) a first frame slot projecting downward from the upper surface of said first frame,
   c) a first caster attached to the lower surface and adjacent the first end of said first frame,
   d) a second caster attached to the lower surface and adjacent the second end of said first frame, wherein said first and second casters are attached by means of a bolt that projects upward through the lower surface of said first frame leaving an interval, vertical post on each end,
   e) a second frame having a first end, a second end, an upper surface and a lower surface,
   f) a second frame slot projecting upward from the lower surface of said second frame,
   g) a third caster attached to the lower surface and adjacent the first end of said second frame,
   h) a fourth caster attached to the lower surface and adjacent the second end of said second frame, wherein the second frame slot on said second frame is dimensioned to fit into the first frame slot on said first frame, wherein when the two slots interface the upper and lower surfaces of the first frame are on the same plane on the top and lower surfaces of the second frame to thus form a stable platform, and
   i) a flexible pull strap having:
      (1) an inner end attached to a slotted buckle having an integrally attached outward projecting flat section having a bore therethrough, wherein when the flat section is inserted into the first or second ends of said first frame the bore seats itself over the respective vertical post causing the strap to be quickly attached and detached, wherein when attached said dolly can be pulled by means of the strap, and
      (2) an outer end which terminates in a loop to facilitate the grasping and pulling of said strap.

2. The dolly as specified in claim 1, wherein said flexible strap has an inner end and an outer end, wherein each end is attached to a slotted buckle having an integrally attached outward projecting flat section having a bore therethrough, wherein when a flat section is inserted into each end of said first frame, the bore seats itself over the respective vertical post to thus form a loop which can be grasped and used to pull or lift said dolly.

3. The dolly as specified in claim 1 further comprising a rigid telescoping handle having:
   a) an inner end terminating in a flat section having a bore therethrough, wherein when the flat section is inserted into the first or second ends of said first frame the bore seats itself over the respective vertical post causing the handle to be swively attached which allows said dolly to be pulled by the handle, and b) an outer end which includes a hand grip to facilitate the grasping and pulling of the telescoping handle.

4. The dolly as specified in claim 1 further comprising a non-slip pad that is attached by an attachment means to the upper surface of said first and second frames, wherein the non-slip pad extends over the first and second ends of said second frame.

5. The dolly as specified in claim 1 further comprising a set of hook and loop fasteners attached to the sides of said first and second frames, wherein when the two sides interface they are attached by the hook and loop fasteners allowing said dolly to be conveniently and easily carried.

6. The dolly as specified in claim 1 further comprising a strap retracting and extending device comprising:

a) said first frame having:
 (1) a crank bore extending through the first and second sides,
 (2) a crank access opening located on the upper surface over the crank bore, and b) a strap crank having a shaft with an inner end and an outer end, wherein from the outer end extends integrally an offset section, wherein the shaft is rotatably inserted into the crank bore with the inward end protruding through the second side of said first frame and the offset section protruding through the first side of said first frame, wherein a cap is attached to the inward end to secure said strap crank to said first frame, wherein the inner end of said pull strap is attached, by an attachment means, to the shaft of said crank, wherein to extend said pull strap it is pulled outward and to retract said strap the offset section is rotated to cause the pull strap to be wound onto the shaft.

7. The dolly as specified in claim 6 wherein said means for attaching the inner end of said pull strap to the shaft comprises:

a) the shaft having a longitudinal split, and b) said pull strap having a lateral obstruction across the inner end, wherein when the strap is inserted into the split shaft the obstruction secures said strap to the shaft.

8. The dolly as specified in claim 1 wherein said means for attaching the inner end of said pull strap to the shaft comprises:

a) the shaft having a longitudinal split, and b) said pull strap having a lateral obstruction across the inner end, wherein when the strap is inserted into the split shaft the obstruction secures said strap to the shaft, wherein said pull strap has an outer end attached to a slotted buckle having an integrally attached outward projecting flat section having a bore therethrough, wherein when the flat section is inserted into the second end of said first frame the bore seats itself over the vertical post to secure said strap and form a loop which can then be grasped to carry said dolly.

* * * * *